(12) United States Patent
Seet et al.

(10) Patent No.: US 6,760,551 B2
(45) Date of Patent: Jul. 6, 2004

(54) ADAPTIVE DECODER FOR SKIN EFFECT LIMITED SIGNALS

(75) Inventors: Adrian Wan-Chew Seet, Sunnyvale, CA (US); Ken Nishimura, Fremont, CA (US); Richard C. Walker, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 80 days.

(21) Appl. No.: 10/283,566

(22) Filed: Oct. 29, 2002

(65) Prior Publication Data

US 2004/0080337 A1 Apr. 29, 2004

(51) Int. Cl.[7] .......................... H04B 10/06; H01L 29/26
(52) U.S. Cl. ...................... 398/202; 398/203; 375/287; 368/120; 455/134
(58) Field of Search ................ 398/202, 203; 327/74, 75; 375/73, 287, 317; 368/120; 324/158.1; 455/134, 135, 303

(56) References Cited

U.S. PATENT DOCUMENTS

| | | | | |
|---|---|---|---|---|
| 3,896,378 A | * | 7/1975 | Bedford | 368/120 |
| 4,969,207 A | * | 11/1990 | Sakamoto et al. | 455/134 |
| 5,521,941 A | * | 5/1996 | Wiatrowski et al. | 375/287 |
| 6,104,761 A | * | 8/2000 | McCallister et al. | 375/296 |
| 6,271,690 B1 | * | 8/2001 | Hirano et al. | 327/75 |
| 6,684,032 B1 | * | 1/2004 | Umeda | 398/202 |

* cited by examiner

*Primary Examiner*—Vibol Tan

(57) ABSTRACT

The present invention is a decoder for decoding a signal. The decoder includes a discriminator and a threshold generator. The discriminator receives the signal and generates an output voltage equal to a first voltage if the signal is less than a threshold level that is input to the discriminator and equal to a second voltage if the signal is greater than the threshold level. The threshold level depends on the output from the discriminator in a preceding time interval that depends on the impulse response of a transmission link through which the input signal has passed. The threshold generator implements a low-pass analog filter that receives the output voltage during each of the clock periods and generates therefrom a filtered output signal.

18 Claims, 7 Drawing Sheets

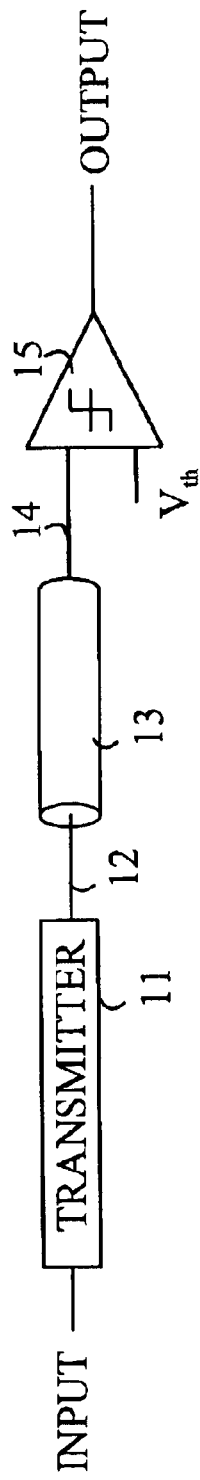
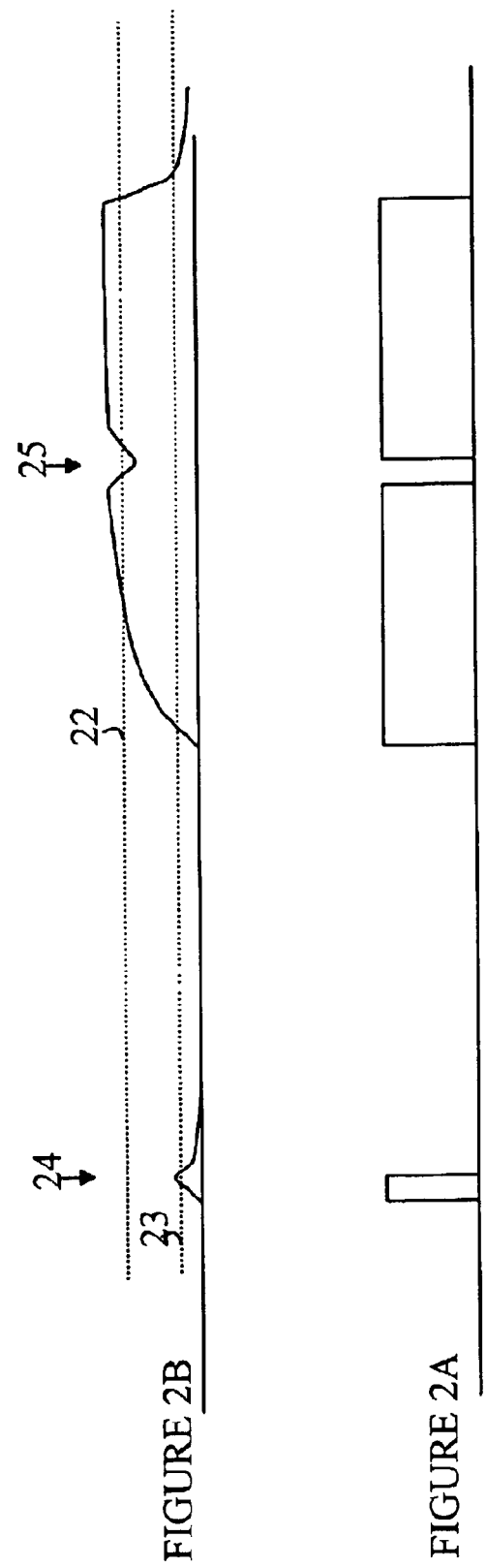
FIGURE 1 (PRIOR ART)
FIGURE 2B
FIGURE 2A

ADAPTIVE DECODER FOR SKIN EFFECT LIMITED SIGNALS

FIELD OF THE INVENTION

The present invention relates to communication systems, and more particularly, to decoders for decoding signals that have distortions introduced by electrical transmission lines.

BACKGROUND OF THE INVENTION

Over the years, the rate of data transmission has displayed an ever-increasing trend. At present, optical systems are routinely capable of transmitting at rates of 40 Gbps and above, while electrical systems are approaching speeds up to 10 Gbps. The advantage provided by the higher transmission rates of optical systems, however, is sometimes offset by the lower costs involved in setting up an electrical transmission system. In addition, electrical transmission systems are more energy efficient than optical systems. The higher power requirements of optical systems often requires that these systems have larger physical dimensions to provide cooling. Hence, in many applications in which the very high data rates of optical systems are not needed, electrical systems are still favored.

Accordingly, increasing the transmission rate of electrical systems still further would be advantageous. One of the factors affecting the speed of electrical systems is the phenomenon known as the skin effect. The penetration depth of an electromagnetic(EM) wave into a conductor is dependent on the frequency of the EM wave. The higher the frequency, the shallower the penetration into the conductor. As a result, when sending a signal down a conductor with a given physical cross-sectional area, the effective area seen by the higher frequency components is smaller than that seen by the lower frequency components. Accordingly, the higher frequencies experience higher impedance than the lower frequencies. This frequency dependent impedance is known as the skin effect.

Data streams can be modulated on an electrical conductor using a number of different chemes. The two most common schemes are return to zero (RZ) and non-return to zero NRZ). In RZ modulation, the modulation of each bit of information begins and ends at the same voltage level, which is usually ground. Hence, a transmission consisting of a string of N Is ideally appears as a string of N individual pulses having a width of one half time period each and a voltage V. In NRZ schemes, the modulation level is not returned to the same level at the end of each bit. In an NRZ transmission scheme, the string of N Is would ideally appear as a single pulse that is N time periods long with a voltage V.

In NRZ transmission schemes that suffer from skin effect, the rise and fall times of the pulses is increased due to the loss of energy at the high frequencies. If the rise and fall times are long compared to the time period allocated for each bit, the potential to which the signal rises on the conductor will depend on the bit pattern. This bit pattern dependence can lead to bit errors when the signal is decoded at the receiving end of the transmission line.

Prior art systems attempt to overcome this problem by adjusting the data stream signal at either the transmission or reception end of the communication channel. At the transmission end of the channel, these systems alter the pulse shapes to provide more energy in the high frequency components thereby compensating for the loss of high frequency information during transmission.

This type of system requires that additional high frequency energy be provided to compensate for the eventual loss through the communication medium. This additional high-frequency signal energy exacerbates cross talk at the sending end of the communication link. In addition, increasing the high frequency energy content at the transmitter results in higher power consumption.

The second class of equalization solutions operates by providing an inverse skin effect filter at the reception end of the transmission line. Such a filter must have a large gain at the high frequencies to make up for the lost energy in the communication channel. At very high frequencies, high gain filters of this type with sufficiently low noise are difficult to construct.

Broadly, it is the object of the present invention to provide an improved data decoding system.

This and other objects of the present invention will become apparent to those skilled in the art from the following detailed description of the invention and the accompanying drawings.

SUMMARY OF THE INVENTION

The present invention is a decoder for decoding a signal. The decoder includes a discriminator and a threshold generator. The discriminator receives the signal and generates an output voltage equal to a first voltage if the signal is less than a threshold level that is input to the discriminator and equal to a second voltage if the signal is greater than the threshold level. The threshold level depends on the output from the discriminator in a preceding time interval that depends on the impulse response of a transmission link through which the input signal has passed. The threshold generator implements a low-pass analog filter that receives the output voltage during each of the clock periods and generates therefrom a filtered output signal. The threshold generator may also implement a variable gain amplifier for amplifying the filter output signal by an amount specified by a gain input signal to generate the threshold level. The gain input signal depends can be set with reference to a timing signal indicative of whether the input signal crossed the threshold level at a time that was early or late relative to the beginning of a clock period. The gain input signal during one of the clock periods preferably depends on the timing signal and the output of the discriminator during two clock periods prior to that clock period. The threshold generator may also include a circuit for offsetting the threshold level by an amount determined by the timing signal and the previously generated output voltage values.

BRIEF DESCRIPTION OF THE DRAWINGS

FIG. 1 is a schematic drawing of a simplified prior art NRZ communication link and data-decoding scheme.

FIG. 2A illustrates a typical signal pattern at input 12 to the communication link shown in FIG. 1.

FIG. 2B illustrates the signal at the output end of transmission link 13 shown in FIG. 1.

DETAILED DESCRIPTION OF THE PREFERRED EMBODIMENTS OF THE INVENTION

Figure 3:
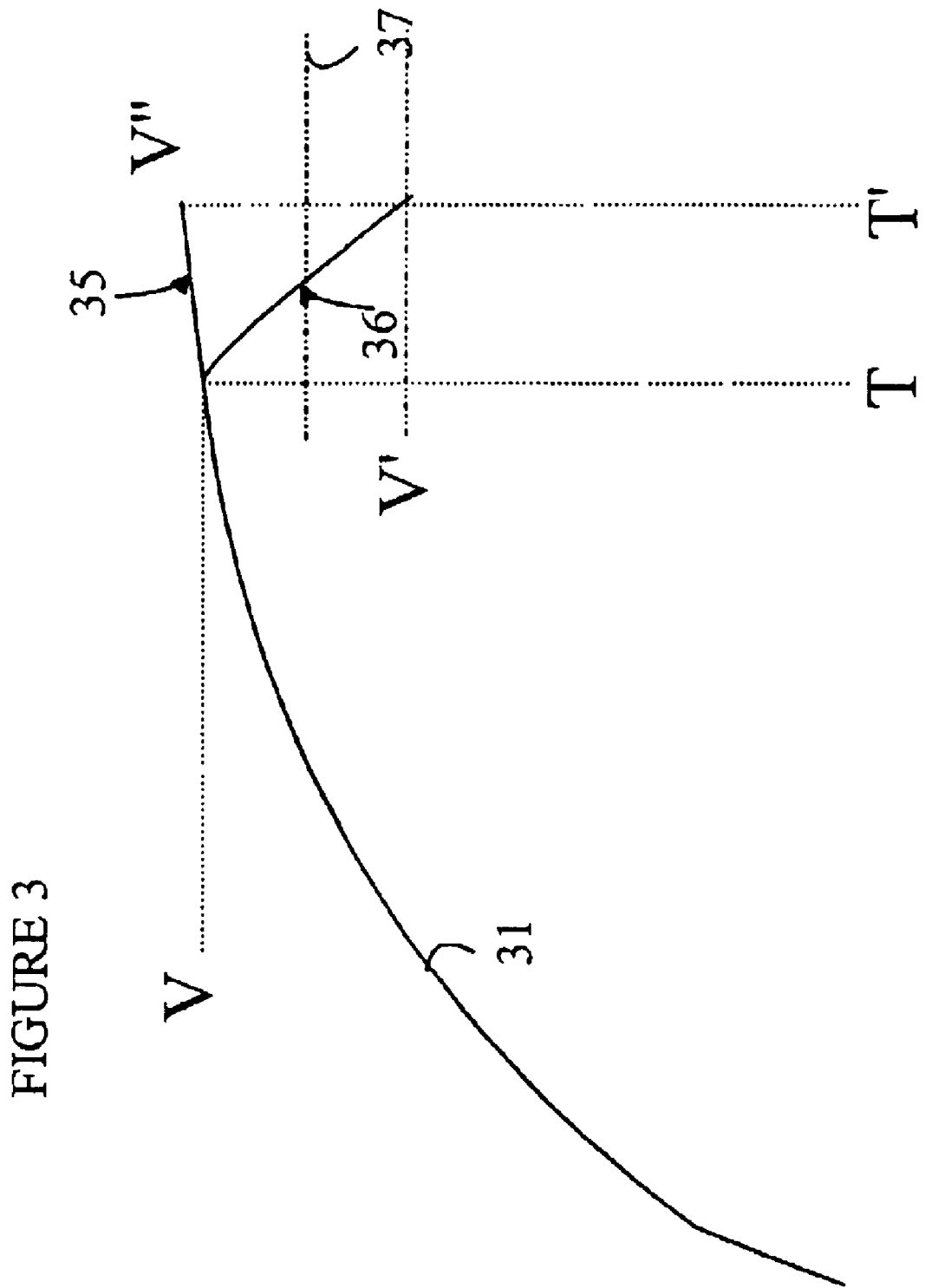
FIG. 3 illustrates the voltage at the output end of a skin effect limited communication link when a sequence of 1s has been transmitted.

The manner in which the present invention provides its advantages can be more easily understood with reference to FIG. 1, which is a schematic drawing of a simplified prior art NRZ communication link and data decoding scheme. The data to be sent on communication link 13 is placed on the signal conductor by a transmitter 11 which modulates the potential of the conductor at the input 12 to the communication link. At the output 14 of communication link 13, a discriminator 15 attempts to recover the input data by comparing the potential on line 14 with a threshold level $V_{TH}$. If the measured potential is above $V_{TH}$, the output of discriminator 15 is the potential associated with a logical 1. If the measured potential is below $V_{TH}$, the output of discriminator 15 is set to the potential associated with a logical 0.

Refer now to FIG. 2A, which illustrates a typical signal pattern at input 12 to the communication link. This pattern corresponds to a bit stream of the form . . . 00001000000111111110111111100000. If transmission link 13 suffers from skin effect or other high frequency attenuation, the input signal shown in FIG. 2A will be transformed into the output signal shown in FIG. 2B, which illustrates the signal at the output end of transmission link 13. If $V_{TH}$ m is set at a level 23 such that discriminator 15 will detect the peak at 24, then the 0 bit at 25 will be mistakenly set to a logical 1, since the potential associated with that bit does not fall below level 23. On the other hand, if $V_{TH}$ is set to level 22, then the 1 shown at 24 will be mistakenly set to a logical 0, since the potential associated with that bit does not reach level 22. Hence, there is no single threshold value that will properly decode the output.

The present invention overcomes this problem by providing a variable threshold to the discriminator. The manner in which the threshold is varied may be more easily understood with reference to a simple example. Refer now to FIG. 3, which illustrates the voltage 31 at the output end of a skin-effect limited communication link when a sequence of 1s has been transmitted. As noted above, the communication channel has a slow rise time, and hence, the voltage at the output increases slowly toward the voltage level assigned to logical 1. After a number of bits have passed, the potential V at the output of the communication channel is as shown at T. It the next bit is a one, the potential will follow the curve shown at 35. If the next bit is a 0, the voltage will follow the curve shown at 36. When the discriminator samples the voltage at T', the correct result will be obtained if the threshold at the discriminator is between V' and the V". Ideally, the threshold is set half way between V' and V" at 37.

In a NRZ system, the optimum threshold will depend on the values of a number of previously transmitted bits. The number of bits needed to predict the correct threshold value depends on the extent to which the skin effect spreads the signal corresponding to each bit time. Consider the case in which a step function is input into the communication link, i.e., the bit pattern . . . 00000000000111111111111 . . . is sent. In the absence of the skin effect, the potential at the receiving end of the communication link would be a step function that rises from 0 to $V_{max}$ at a time corresponding to the 0 to 1 transition. The skin effect spreads this rise time so that the signal has a long slow rising tail that requires a number of bit times to reach $V_{max}$. The time needed for this tail to reach a potential substantially equal to $V_{max}$ determines the number of bits whose values must be taken into account in determining the optimum threshold to be used in decoding each bit. The number of bits that must be taken into account will be denoted by $N_b$ in the following discussion.

Figure 4:
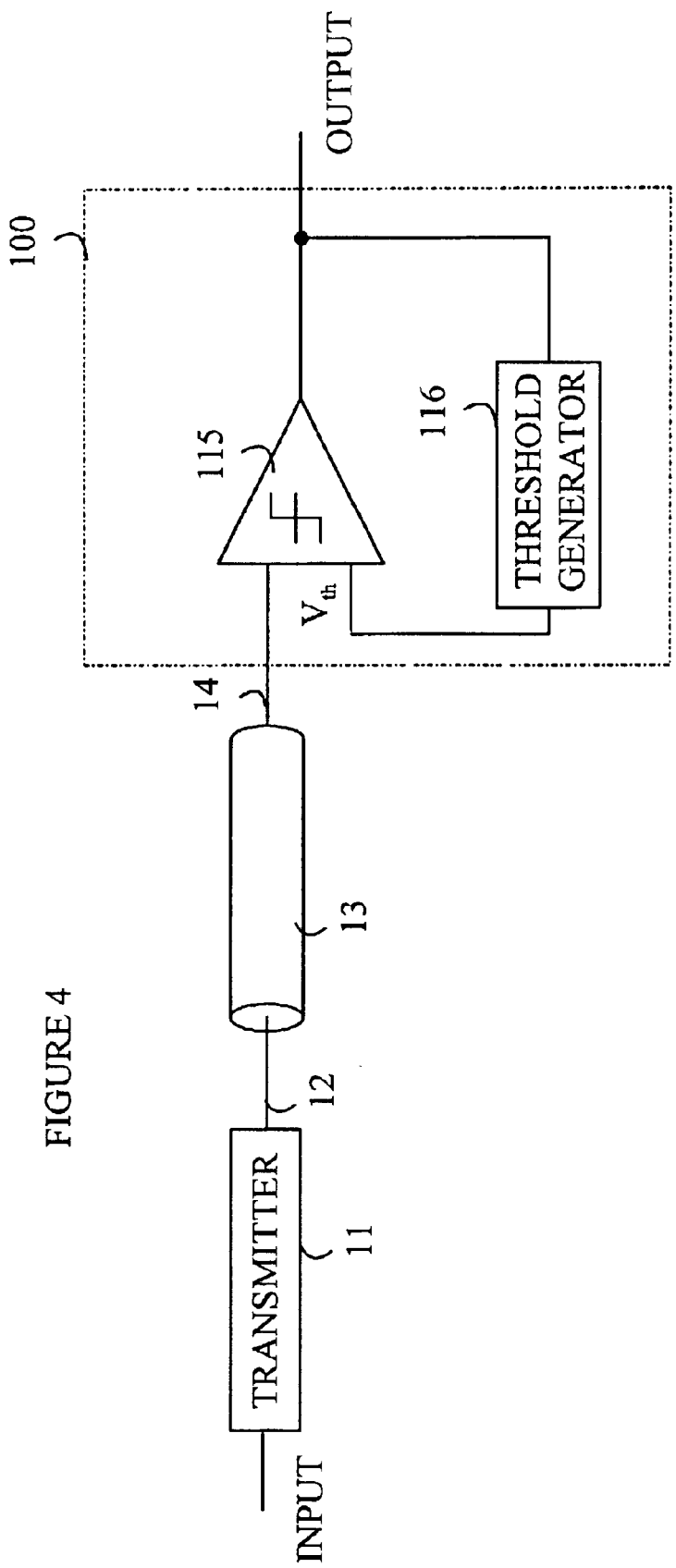
FIG. 4 is a block diagram of a decoder 100 according to one embodiment of the present invention.

Refer now to FIG. 4, which is a block diagram of a decoder 100 according to one embodiment of the present invention. Decoder 100 utilizes a discriminator 115 and a threshold generator 116 to decode the signal from communication link 14. Threshold generator 116 varies the threshold voltage applied to discriminator 115 depending on the previously received bit stream as decoded by discriminator 115.

Figure 5:
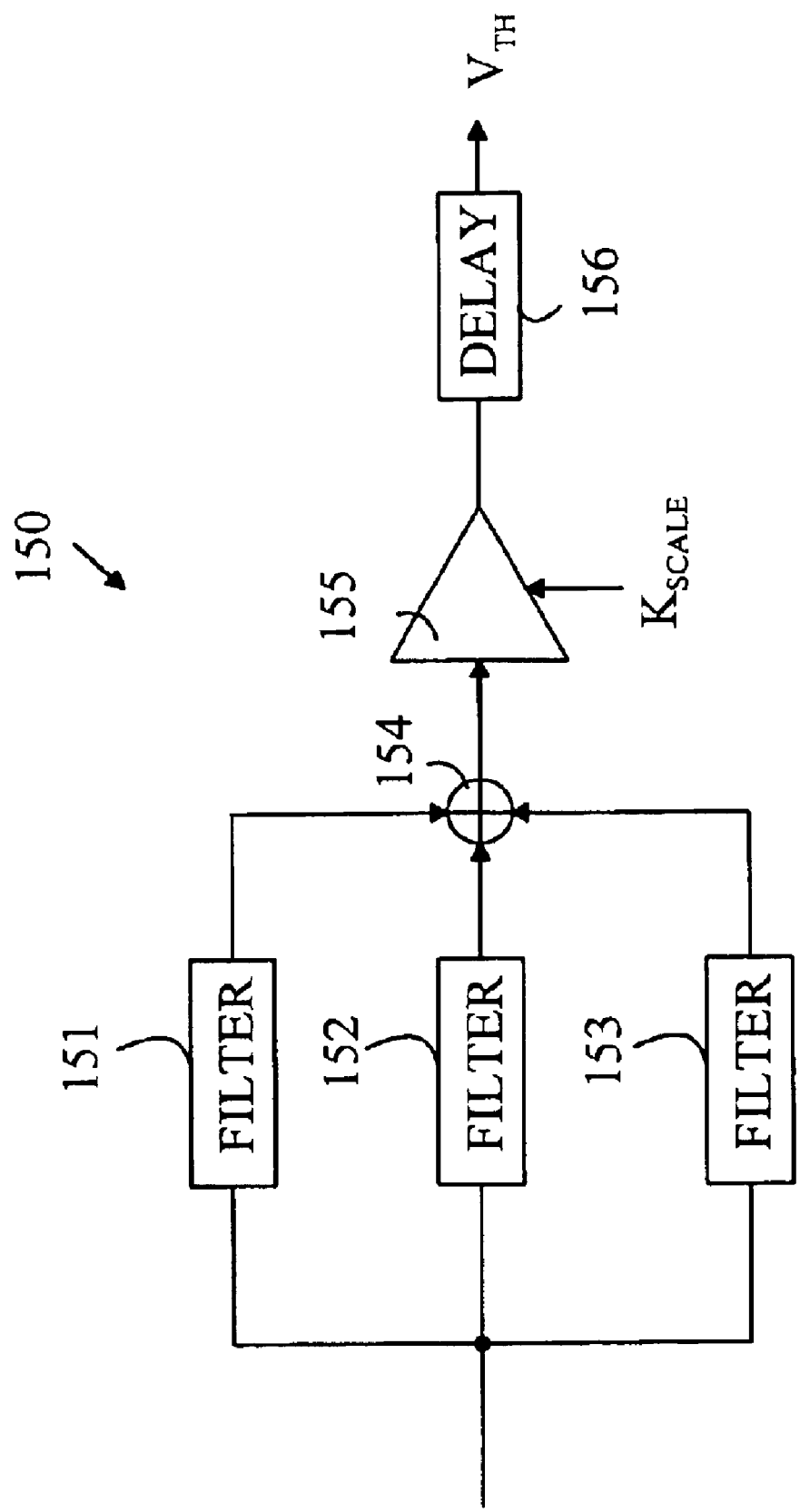
FIG. 5 is schematic drawing of one embodiment of a threshold generator according to the present invention.

Refer now to FIG. 5, which is a schematic drawing of one embodiment of a threshold generator according to the present invention. Threshold generator 150 includes three single pole filters 151–153 whose outputs are summed by adder 154. The output of adder 154 is scaled by a factor $K_{SCALE}$ by amplifier 155 to generate the output threshold potential $V_{TH}$. The input to each filter is the output of the discriminator. Each filter is characterized by a pole frequency and a gain factor. These parameters are chosen such that the summed output of the three filters approximates the tail of the step response of the skin effect limited transmission link after one bit time. Mathematically, this can be expressed by the following expression $$y(t) = u(t+t_b) - u(t_b) \quad t >= 0$$

$$y(t) = 0 \qquad\qquad\qquad t < 0$$

where y(t) is the threshold voltage $V_{TH}$, u(t) is the step response and $t_b$ is the bit time. That is, the signal leaving adder 154 when a signal corresponding to an NRZ modulation of . . . 00000001111111111 . . . is input to the filters, has the same shape as the signal leaving the communication link when the same sequence is placed on the input to the communication link. This threshold value is delayed by one bit time by delay circuit 156. It should be noted that the delays inherent in the filters, adder, and amplifier may provide part or all of this delay. In the later case, delay circuit 156 can be eliminated.

It should be noted that the shape of the signal leaving the communication link when the above-described step function is input thereto does not change significantly if the length of the communication link is changed over a range of lengths in a skin effect limited communication link. That is, the attenuation of the signal increases, but the shape remains substantially the same as the length of the communication link is increased. As a result, changes in length of the communication link can be accommodated by changing $K_{SCALE}$.

Figure 6:
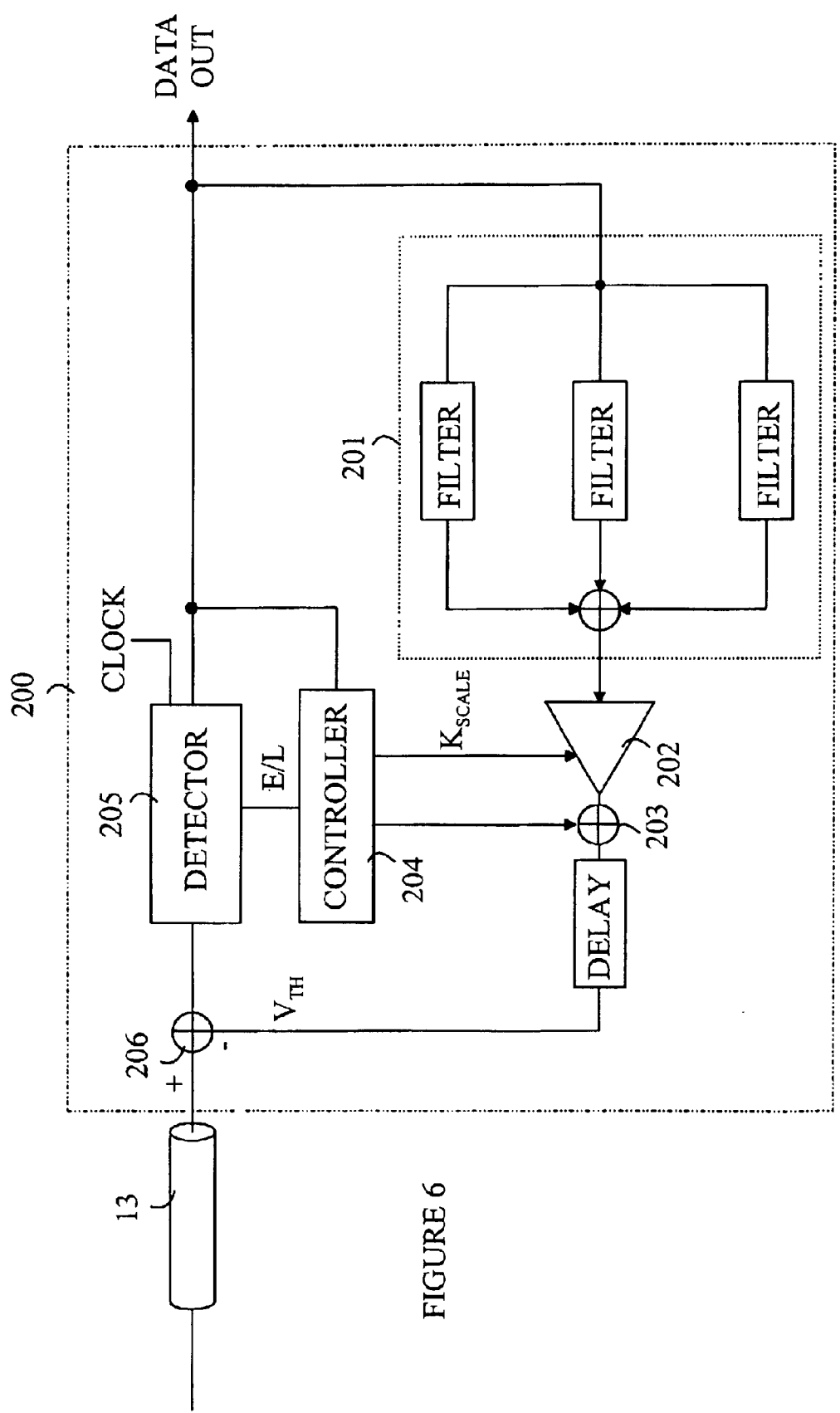
FIG. 6 is a block diagram of a decoder 200 according to another embodiment of the present invention.

Embodiments of the invention in which $K_{SCALE}$ is adjusted automatically can also be practiced. These embodiments are based on the observation that $K_{SCALE}$ also alters the timing of the transition between unlike bits. Refer now to FIG. 6, which is a block diagram of a decoder 200 according to another embodiment of the present invention. Decoder 200 utilizes a filter bank 201 and scaling amplifier 202 to generate the threshold potential in a manner similar to that described above. Decoder 200 utilizes a discriminator having a detector 205 that performs the discrimination function discussed above. For the purposes of this discussion, detector 205 utilizes a fixed threshold value. Accordingly, the variable threshold of the present invention is implemented by utilizing a difference circuit 206 that subtracts a potential $V_{TH}$ from the incoming signal.

Detector 205 also determines whether or not the transition between successive bits is early or late relative to a clock that specifies the time at which the transition between bits should occur. This determination is communicated in the form of an E/L signal that indicates whether the transition was early or late.

Decoder 200 has a controller 204 that monitors the data leaving detector 205 and the E/L signal. The controller uses this information to increase or decrease $K_{SCALE}$. Only the early/late indication for the current bit and the history of the previous 2 bits are utilized. There are two cases of interest. In the first case, the two previous bits are the same, and in the second case, the two previous bits are different. The manner in which controller 204 alters $K_{SCALE}$ is summarized below:

| Previous 2 bits | Transition | Action |
|---|---|---|
| 00, 11 | Early | decrease $K_{SCALE}$ |
|  | Late | increase $K_{SCALE}$ |
| 01, 10 | Early | increase $K_{SCALE}$ |
|  | Late | decrease $K_{SCALE}$ |

It should be noted that controller 204 only needs to adjust $K_{SCALE}$ on a periodic basis. In general, $K_{SCALE}$ is expected to change in response to changes in the communication link's length or changes in slowly varying environmental variables such as temperature. Hence, the only high-speed digital circuitry required by controller 204 is a register, such as shift register, in which the values of the previous two data bits can be stored.

The above-described embodiment of the present invention assumes that a detector that can provide the early/late signal is available. An Alexander-type phase detector of the type commonly used to extract timing information from an incoming data stream can be utilized to provide this signal. Multi-phase detectors of this type are capable of operating at the high data rates at which the present invention is designed to operate.

Embodiments having an early/late detector can also incorporate a compensation system for drift in the base line of the input signal. In such embodiments, controller 204 provides a DC level to an adder 203 that shifts the DC level of $V_{TH}$. The algorithm used to adjust the DC level depends on the early/late signal for the current transition and on whether or not the transition was a 0 to 1 (i.e., rising) or a 1 to 0, (i.e., falling). The compensation algorithm executed by controller 204 is summarized below.

| Direction | D/L | Action |
|---|---|---|
| Rise | Early | Decrease DC level |
| Rise | Late | Increase DC level |
| Fall | Early | Increase DC level |
| Fall | Late | Decrease DC level |

The present invention can utilize a wide range of discrimination circuits. For example, the discrimination and one-bit delay functions can be implemented in a re-timing latch. Similarly, a subtraction node followed by a limiting amplifier with a combined delay of one-bit can be utilized to perform the discrimination function.

The above-described embodiments of the present invention utilized a three-filter bank to generate the threshold voltage. However, other forms of filter banks can be utilized. In addition, the number of filters in the filter bank can also be varied without departing from the teachings of the present invention. While the ideal filter bank duplicates the shape of the step response of the communication link, filters that only approximate this response may be utilized and still provide advantages over systems that do not utilize a variable threshold.

The above-described embodiments of the present invention utilize an analog filter bank to generate the variable threshold value because such a filter bank can operate at data rates in excess of 10 Gb/s. However, in systems having lower data rates, digital embodiments of the present invention can be utilized. Such embodiments would utilize a threshold generator having a look-up table that stores the correct threshold value for each possible combination of $N_b$ previously received bits.

As noted above, the present invention is particularly useful in decoding signals from a skin-effect limited communication link, since the invention can accommodate a wide variety of communication link lengths by merely adjusting $K_{SCALE}$. However, the present invention is also useful in decoding data streams from communication links having other distortion functions. In such cases, the filter bank, or lookup table, ideally matches the new distortion function.

The above-described embodiments of the present invention have assumed that the data stream being decoded is a binary transmission, i.e. a sequence of 1s and 0s. However, embodiments of the present invention may also be constructed to decode multi-level transmissions in which the data stream consists of a sequence of symbols having values from 0 to N, where N>1. In such a transmission, each symbol is represented by a discrete voltage level. A conventional decoder for decoding such a transmission consists of a discriminator that has N−1 threshold values and outputs the lowest discrete voltage level for which the potential is greater than $V_k$, where $V_k$ is the potential of the $k^{th}$ threshold for k=1 to N−1. That is, given N discrete output levels $V_{O1} \ldots V_{ON}$ and N−1 threshold level $V_1 \ldots V_{N-1}$, the multilevel discriminator has a transfer function described by,

| | |
|---|---|
| Vout = $V_{Ok}$ if $V_k < V_{1n}$ | k = N − 1 |
| Vout = $V_{Ok}$ if $V_k < V_{1n} < V_{k+1}$ | k = 1 . . . N − 2 |
| Vout = $V_{Oo}$ if $V_{1n} < V_k$ | k = 1 |

Figure 7:
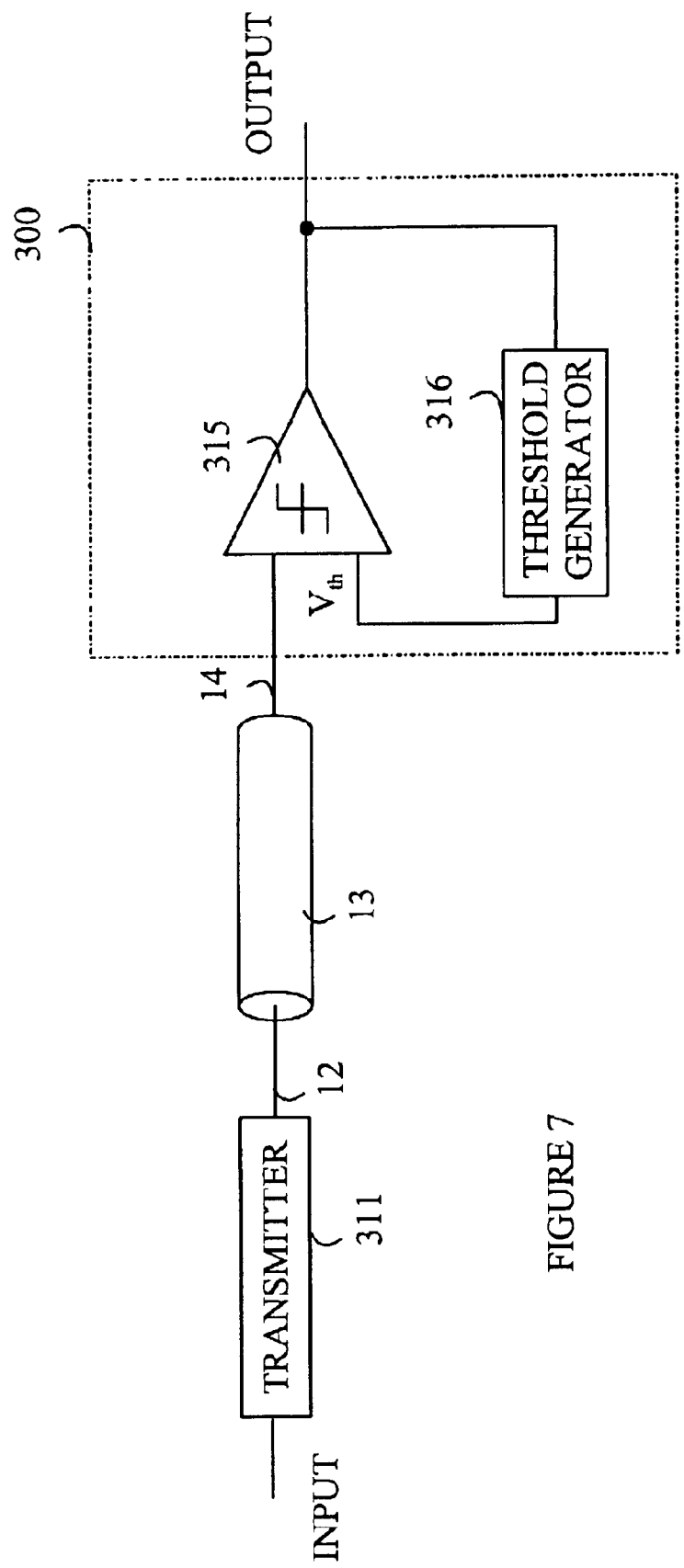
FIG. 7 is a schematic view of a decoder 300 according to another embodiment of the present invention for decoding a multilevel input signal.

Refer now to FIG. 7, which is a schematic view of a decoder 300 according to another embodiment of the present invention for decoding a multilevel input signal generated by transmitter 311. Decoder 300 is similar to decoder 100 shown in FIG. 4 in that decoder 300 utilizes a discriminator 315 that accepts a threshold value Vth generated by threshold generator 316 which utilizes the previous signal values generated by discriminator 315 to determine the value of Vth. For the purposes of this discussion, it will be assumed that discriminator 315 generates the N−1 threshold values discussed above from Vth internally. In the simplest embodiment, the $k^{th}$ threshold value is equal to Vth +(k−1)d, were d is the difference between successive discrete voltage levels in the transmission scheme implemented on the communication link.

Threshold generator 316 can be constructed in the same manner as the threshold generators discussed above for the binary transmission case. That is, the filter arrangements discussed above also provide the correct Vth for the multi-level transmission cases. It can also be shown that the other binary embodiments of the present invention can be similarly extended to the multi-level transmission system.

The above-described embodiments of the present invention have been described in terms of analog filters. Such filters can be implemented in from conventional analog components. If the data rates are sufficiently low, these filters can also be implemented digitally.

Figure 8:
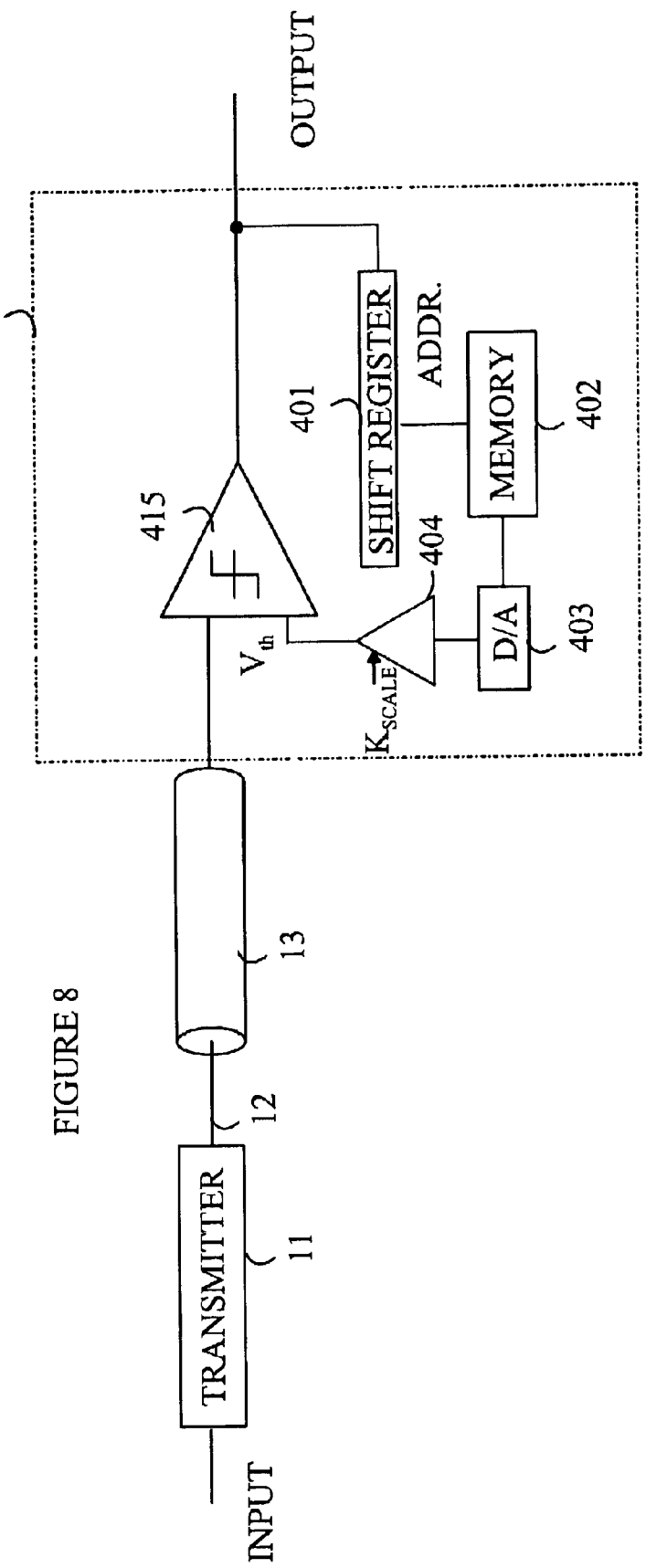
FIG. 8 is a schematic drawing of a threshold generator that utilizes such a look-up table.

While the preferred embodiments of the present invention utilize filters to generate Vth, it should be noted that a digital processor utilizing a look-up table can also be utilized at low data rates. Such a system would store the correct threshold value for each possible sequence of previously received bits. The number of bits that would need to be covered by the table depends on the tail of the impulse response of the transmission line as discussed above. If the significant part of the tail extends over M bit periods, than a table having an M-bit address can be utilized. Refer now to FIG. 8, which is a schematic drawing of a threshold generator that utilizes such a look-up table. Threshold generator 400 includes a shift register 401 that receives the output of the discriminator 415 for each bit period. Shift register 401 stores the M previously decoded signal values. Each new decoded value is shifted into shift register 401 and the oldest value is shifted off the end of he shift register. Shift register 401 serves as the address register for a memory 402 that stores a set of values related to the threshold values. The stored values can be computed by simulating the analog filters discussed above. A digital-to-analog converter 403 generates the analog threshold value from the stored digital values. An optional scaling amplifier 404 may also be included to provide the scaling functions discussed with reference to the analog filter embodiments discussed above.

The above-described embodiments of the present invention have been described in terms of a discriminator that samples an input signal at times specified by a clock and generates a quantized output signal based on the sampled value. However, asynchronous embodiments of the invention can also be constructed. For example, the embodiment shown in FIG. 4 can utilize a discriminator that continuously compares the input signal. When the input signal is greater than the threshold, the discriminator outputs a first voltage level. When the input is less than the threshold level, the discriminator outputs a second voltage level. The discriminator output can change because the signal level changes or because the threshold level changes in such embodiments.

The embodiments of the threshold generator shown in FIG. 5 utilize a single scaling amplifier to adapt the threshold generator to transmission links of different lengths. However, other arrangements can be utilized for providing such adaptation. For example, each of the filters shown in FIG. 5 can include a scaling circuit that scales the output of that filter by a function of the form $A^*K_{SCALE}+B$, where A and B are constants that are determined empirically for each filter. In such a system, $K_{SCALE}$ can be automatically adjusted using the algorithm described above.

Various modifications to the present invention will become apparent to those skilled in the art from the foregoing description and accompanying drawings. Accordingly, the present invention is to be limited solely by the scope of the following claims.

What is claimed is:

1. A decoder for decoding a signal, said decoder comprising:
 a discriminator, said discriminator receiving said signal and generating an output voltage equal to a first voltage if said signal is less than a threshold level that is input to said discriminator and equal to a second voltage if said signal is greater than said threshold level; and
 a threshold generator that generates said threshold level depending on said output from said discriminator during a preceding time period.

2. The decoder of claim 1 wherein said preceding time period depends on an impulse response of a transmission link through which said signal passes prior to being received by said discriminator.

3. The decoder of claim 1 wherein said threshold generator comprises a low-pass filter that receives said output voltage and generates therefrom a filtered output signal.

4. The decoder of claim 3 further comprising a variable gain amplifier for amplifying said filter output signal by an amount specified by a gain input signal to generate said threshold level.

5. The decoder of claim 4 wherein said discriminator receives a clock signal defining a plurality of clock periods and wherein said discriminator further generates a timing signal indicative of whether said input signal crossed said threshold level at a time that was early or late relative to said clock periods, said decoder further comprises a controller that generates said gain input signal.

6. The decoder of claim 5 wherein said gain input signal generated by said controller during one of said clock periods depends on said timing signal and said output of said discriminator during two clock periods prior to that clock period.

7. The decoder of claim 3 wherein said filter comprises a plurality of single pole filters connected in parallel.

8. The decoder of claim 5 further comprising a signal for shifting said threshold level by an amount determined by an offset signal.

9. The decoder of claim 8 wherein said offset signal depends on said timing signal.

10. A method for decoding a signal, said method comprising:
 during a time period, generating an output voltage equal to a first voltage when said signal is less than a threshold level and equal to a second voltage when said signal is greater than said threshold level; and
 generating said threshold level in response to said output voltage during a preceding time period.

11. The method of claim 10, wherein said preceding time period depends on an impulse response of a transmission link through which said signal passes prior to said generating.

12. The method of claim 10, wherein said generating comprises low-pass filtering said output voltage to generate therefrom a filtered output signal.

13. The method of claim 12, further comprising variably amplifying said filtered output signal by an amount specified by a gain input signal to generate said threshold level.

14. The method of claim 13, further comprising:
 receiving a clock signal defining a plurality of clock periods;
 generating a timing signal indicative of whether said input signal crossed said threshold level at a time that was early or late relative to said clock periods; and
 generating said gain input signal in response to said timing signal.

15. The method of claim 14, wherein said gain input signal in one of said clock periods depends on said timing signal and said output voltage during two clock periods prior to that clock period.

16. The method of claim 14, further comprising shifting said threshold level by an amount determined by an offset signal.

17. The method of claim 16, additionally comprising generating said offset signal in response to said timing signal.

18. The method of claim 12, wherein said low-pass filtering comprises utilizing a filter function equivalent to a plurality of single pole filters connected in parallel.

* * * * *